United States Patent [19]

Rehring

[11] Patent Number: 4,832,725
[45] Date of Patent: May 23, 1989

[54] GLASS FEEDER TUBE-STIRRER ASSEMBLY

[75] Inventor: William F. Rehring, Dallas, Pa.

[73] Assignee: Owens-Illinois Television Products Inc., Toledo, Ohio

[21] Appl. No.: 169,647

[22] Filed: Mar. 18, 1988

[51] Int. Cl.$^4$ ................................. C03B 5/18
[52] U.S. Cl. ........................... 65/180; 65/325
[58] Field of Search .......... 65/180, 325, 330, 331; 222/235

[56] References Cited

U.S. PATENT DOCUMENTS

| | | | |
|---|---|---|---|
| 2,654,184 | 10/1953 | Peiler | 65/180 |
| 2,654,186 | 10/1953 | Peiler | 65/330 |
| 3,174,729 | 3/1965 | Cala | 65/180 |
| 3,508,901 | 4/1970 | Noe | 65/180 |

Primary Examiner—Joye Woodard

[57] ABSTRACT

The refractory tube controlling the flow of glass from a glass feeder bowl is combined with a rotary stirring device used to control surface cord into one unit, herein called a "Tubex"; thereby eliminating one of the two rotary drive mechanisms and also eliminating alignment and relative rotary speed problems. The stirrers are diamond-shaped platinum-rhodium alloy blades connected to the refractory element, preferably as three, equally-spaced stirrers at a common radius on the rotated Tubex element. A novel rotary support mounting and drive for said element is provided. The Tubex is used in TV panel glass manufacturing.

17 Claims, 5 Drawing Sheets

GLASS FEEDER TUBE-STIRRER ASSEMBLY

This invention relates generally to apparatus for feeding molten glass and mixing molten glass in a feeder bowl from which the glass is fed as charges to a glass forming mechanism. More particularly, this invention relates to an improved tube and stirring device, sometimes called a "Tubex" herein, which is a single unit controlled and rotated from a single support and drive and used in the manufacture of pressed optical glass parts, such as television faceplates.

BACKGROUND OF THE INVENTION

In the past, the glass that is melted and refined in a glass furnace is fed through a forehearth channel in which it is conditioned for use in a forming process. The molten glass passes from the forehearth channel into a feeder bowl having a lowermost orifice provided by the bowl well and orifice ring through which the viscous glass flows as a stream. Charges of the molten glass are severed from the flow stream into discreet gobs after the glass exits the orifice ring. The glass flowing from the forehearth channel into the feeder has its linear horizontal flow characteristics effected by change of direction in the feeder bowl to a vertical flow as part of the gob forming process. This process also imparts a stirring action by rotation of a tube. Traditionally, the feeding and vertical flow through the feeder orifice is controlled by a vertical reciprocating needle plunger centered over the orifice and inside the rotating tube. As is shown in U.S. Pat. Nos. 2,654,184 and 2,654,186, concentric with the tube that encircles the plunger is a second separate circular segmented cylindrical element having stirrer paddles or blades. This style mechanism is known in the trade and referred to as a "Turbex" unit. The tube is located in close proximity over the orifice and is vertically adjustble. It is carried on its own mounting and has a rotary drive individual to it. The outermost Turbex arcuate elements have their independent mounting and rotational drive, the Turbex being made up of arcuate segments (usually three) equally spaced on a holder supporting the segments in a cylindrical arrangement concentric about the tube. Vertically dependent, circumferentially-shaped vanes or stirring elements extend into the molten glass feeder. The stirring elements by their rotation in unison about the longitudinal axis of the tube provides mixing and temperature/viscosity homogeneity of the molten glass of the feeder bowl. The tube in its physical position over the feeder orifice can regulate the rate at which glass is admitted to the interior of the tube above the orifice. The outer-spaced Turbex unit assists in controlling surface cord in the glass, the cord occurring primarily by volatilization from the glass surface. Periodically in step with te forming machine, the needle plunger concentrically positioned within the tube is reciprocated vertically toward and away from the orifice to provide a charge of glass below the orifice ring which is severed into a gob by laterally reciprocating shears.

OBJECTS OF THE INVENTION

The main object of the present invention is in an improved mechanism for feeding molten glass to a forming machine by marked reduction in defective glassware and loss of production from downtime associated with the separate mechanisms, the tube and the Turbex, being presently used.

Inasmuch as these are necessary functions in feeding and forming glass in its manufacture, the present invention has a one of its specific objects an improved unitary feeder tube and stirrer assembly in which the tube and stirrers are combined into a single element and supported in the feeder bowl by a single mounting for rotating the element. With this improvement, there need be a single drive coupled to the element for rotating it in the feeder bowl.

The foregoing improvement has as another object reducing the mechanism of the glass feeder for mounting and rotating the tube and stirrer elements as one moving part, thereby simplifying the apparatus. By providing a single rotational unit, the difficulty in concentrically operating the two mechanisms and controlling their rotational speed is obviated; thus, the quality of the glass at the discharge orifice is enhanced. Blister and cord losses are substantially reduced with the use of the present invention.

Another object and advantage obtained by the invention is experienced in reducing bearing failure and maintenance, metal corrosion and resulting glass contamination. Inasmuch as the prior art mechanism consists of three 120° suspended segments supported by its rotary drive, alignment problems of the sections in their interrelation and relation to the feeder tube are overcome by the single mechanism of the invention in which the tube and stirrers are combined into one driven part.

SUMMARY OF THE INVENTION

Apparatus for feeding and circulating molten glass in a feeder bowl comprising a single hollow, elongated, circular cylindrical unit having a circular central bore defined by the longitudinal inner wall surface and a circular cylindrical lower wall surface of one thickness immersed in the glass. Above the lower circular section is an enlarged upper section upon which is suspended plural vertical stirrers which extend along the side of the outwer wall surface and are spaced from the lower section to provide plural vertically dependent stirrer elements. The stirrers are preferably disposed about the lower wall section in equally-spaced relationship. A single supporting frame is disposed above the circular opening of the feeder bowl suspending the unit in operating position in the molten glass. The support includes a means for rotating the tube and stirrers about the center axis. A single drive motor coupled to a rotary driven means of the unit centered over the orifice rotates the tube and stirrers in the molten glass. The rotary supporting frame is supported by a main frame with a means for adjusting the vertical position of the unit toward and away from the orifice at the bottom of the feeder bowl.

DETAILED DESCRIPTION OF THE DRAWINGS

With particular reference to the drawings, the following detailed description of the invention is provided as a preferred embodiment.

Figure 1:
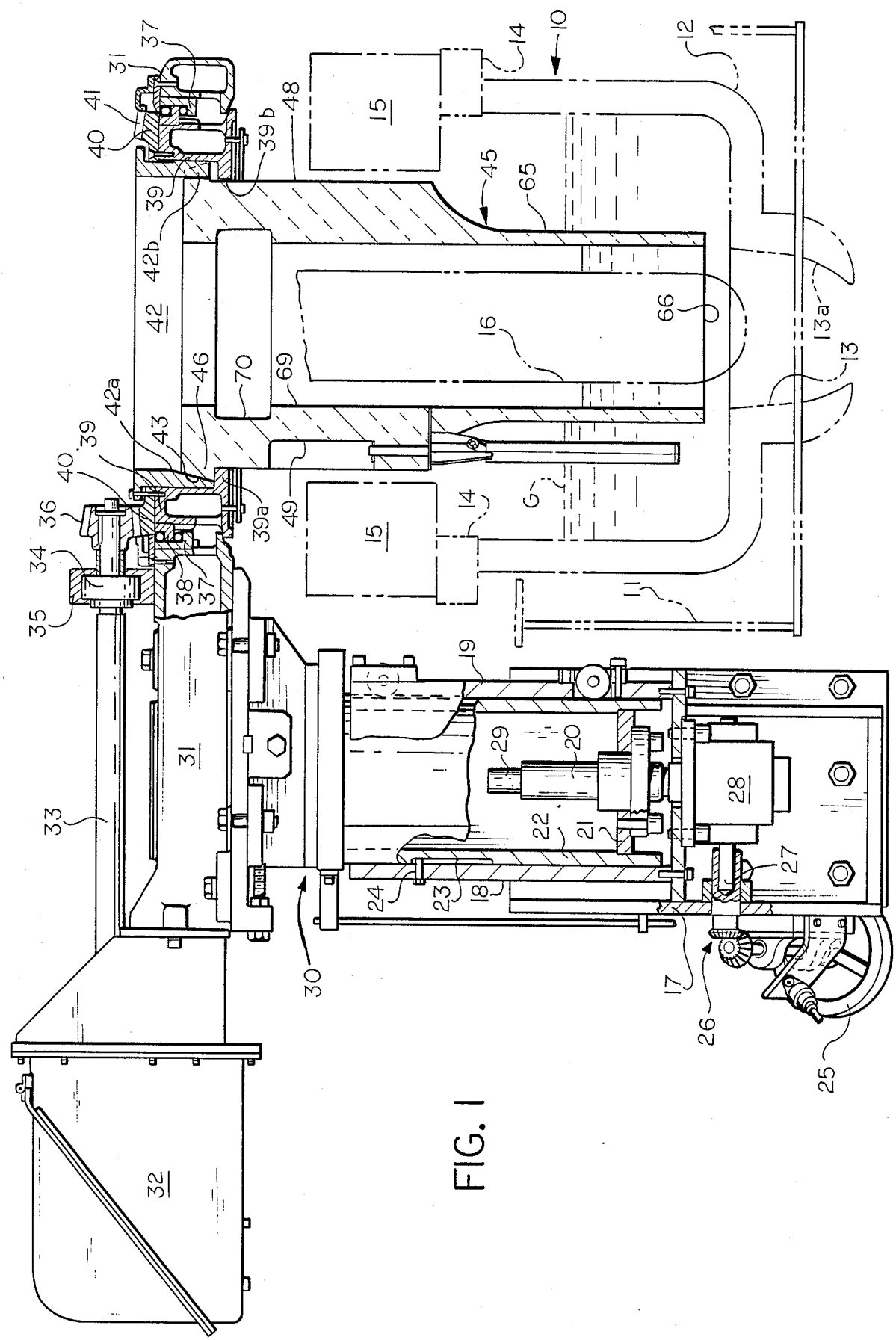
FIG. 1 is a side elevation view, partly in section, of the tube stirrer unit of the invention and its mounting and drive in an operating position in a glass feeder (the latter is shown in phantom outline)
Figure 2:
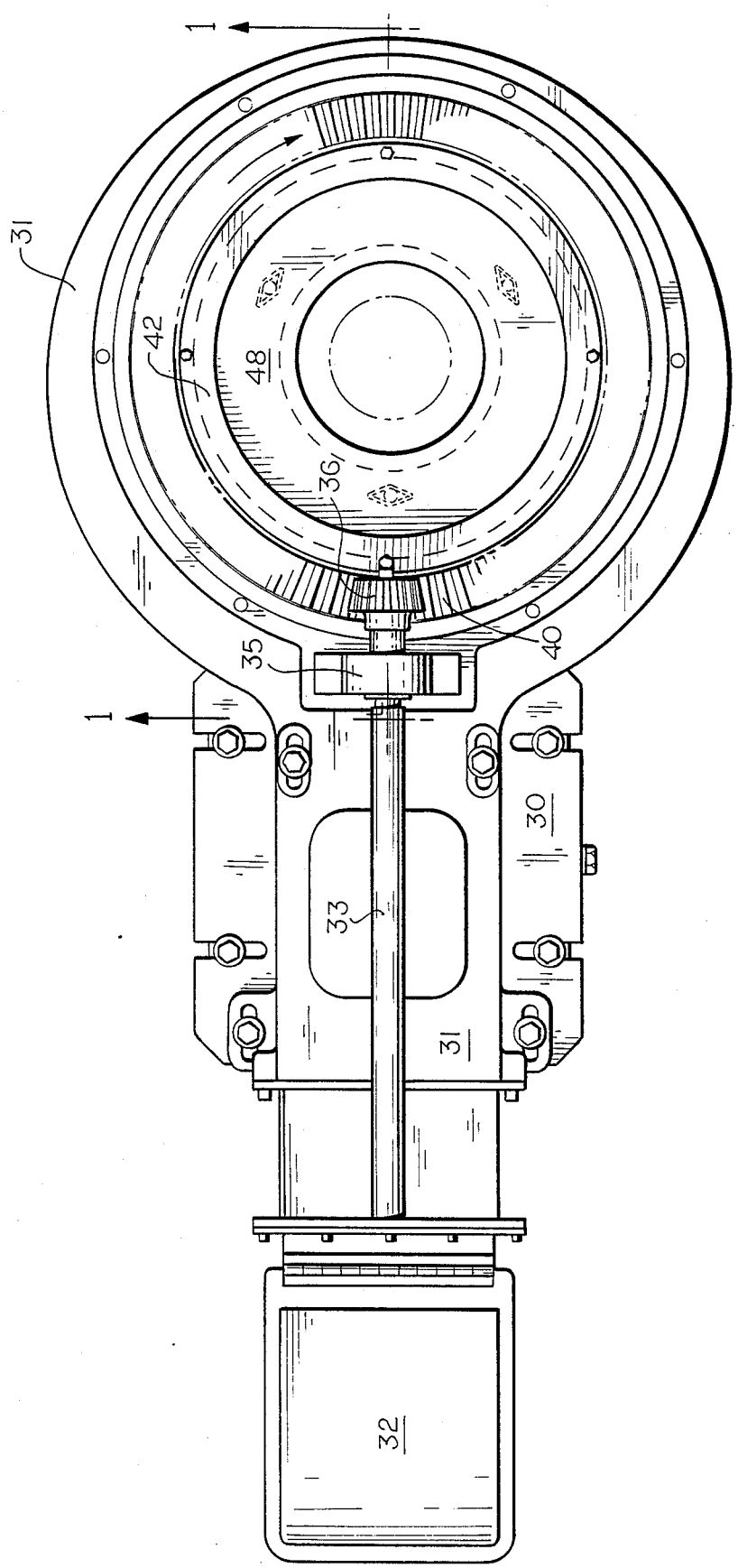
FIG. 2 is a top plan view of the apparatus of FIG. 1.

FIG. 1 illustrates the invention installed in use on a glass furnace feeder (in phantom outline) comprised of a steel supporting frame 11, feeder bowl 12 having a lower orifice defined by a bowl well 13 and orifice ring 13a, cover support or burner blocks 14 and circular cover 15. A conventional vertical circular-section needle plunger 16 is suspended by its operating mechanism (not shown) for vertical reciprocating movement over orifice 13. The plunger is mounted and reciprocated in a typical fashion as is disclosed in U.S. Pat. No. 2,654,186. The tube stirrer mechanism is mounted on a stationary frame along a side of the feeder bowl on the support structure 17 providing a vertical slide frame which includes stationery vertical side members 18 and 19. Inside the vertical frame is a post 20 attached through its cross-piece 21 to the tubular carriage 22. Carriage 22 has vertical slot 23 receiving the pin 24 to restrict the vertical motion. The hand wheel 25 is rotatable in either direction and through a set of meshing bevel gears 26 rotates stub shaft 27 connected to the transmission 28 driving its center output shaft 29 that is theadably connected to the post 20. Rotation of shaft 29 engages its helical threads with corresponding internal threads of post 20 for either raising or lowering the carriage 22. Attached at the top of carriage 22 is horizontal bracket assembly 30 supporting the upper stationary frame 31 including its annular portion (see also FIG. 2) cantilevered over feeder 10 but spaced well above cover 15. The frame 31 also supports motor housing 32 which encloses a hydraulic motor (not shown) connected to rotate output shaft 33. This shaft 33 is rotatably supported in bearing 34 of bracket 35 rigidly fastened on frame 31. The end of shaft 33 has a bevel drive pinion 36 keyed on its end. Integrally with the frame 31 is annular stationery ring casting 37 providing a circular race and bearing housing receiving annular flange 38. An inner ring casting 39 is rigidly secured to annular flange 38. A circular bull gear 40 is rigidly fastened onto the top side of inner ring 39 such that the bevel teeth 41 of gear 40 mesh with the bevel teeth of drive pinion 36. This establishes a holder and rotary mounting for the tube stirrer element (to be presently described) above the glass feeder bowl of the furnace.

The inner ring casting 39 includes lower plate 39a providing a circular aperture 39b for receiving the tube-stirrer element 45. The element 45 is centered in position by the aperture 39b and suspended in the holder on the plate 39a thereof. An upper collar 42 is fastened to holder frame 39 and through its annular taper surface 42a engages the tube stirrer element along its taper surface 43.

Figure 3:
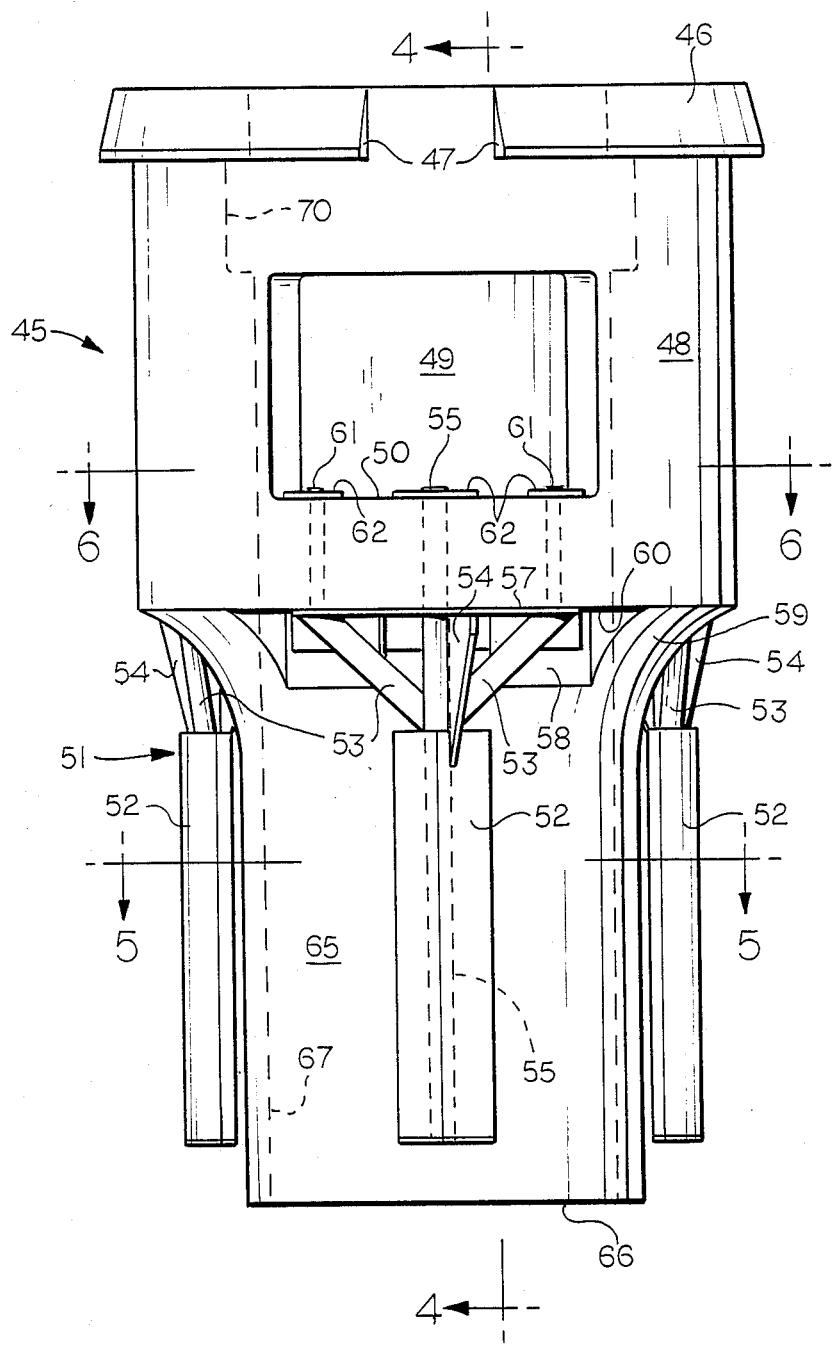
FIG. 3 is a side elevational view of the tube-stirrer unit of the invention showing detail of its construction.

Tube stirrer element 45 is a cast ceramic part of "Bonded AZS", a material used in tube structures and the like for service in molten glass feeders. The upper radially outwardly projecting lip 46 of element 45 rests on lower plate 39a of inner ring support casting 39. There is shown a means of retaining the tuber-stirrer element for locating it on its operating center for rotation. In this construction, lip 46 has vertical slots (FIG. 3) formed between spaced vertical surfaces 47. The upper collar 42 of the inner ring casting includes keys 42b which fit in the slots. The key/slot interengagement provides a rotary drive connection for tube stirrer 45 under power received by the driven bevel gear 40. Three key slots and keys are employed connecting the upper collar 42 and the lip. Alternatively, the keys and slots may be omitted and the collar's annular wedge surface 43 used to firmly clamp on the tapered annular surface 42a at the upper end of element 45 to retain the tube-stirrer element for rotary operation in the glass.

Figure 4:
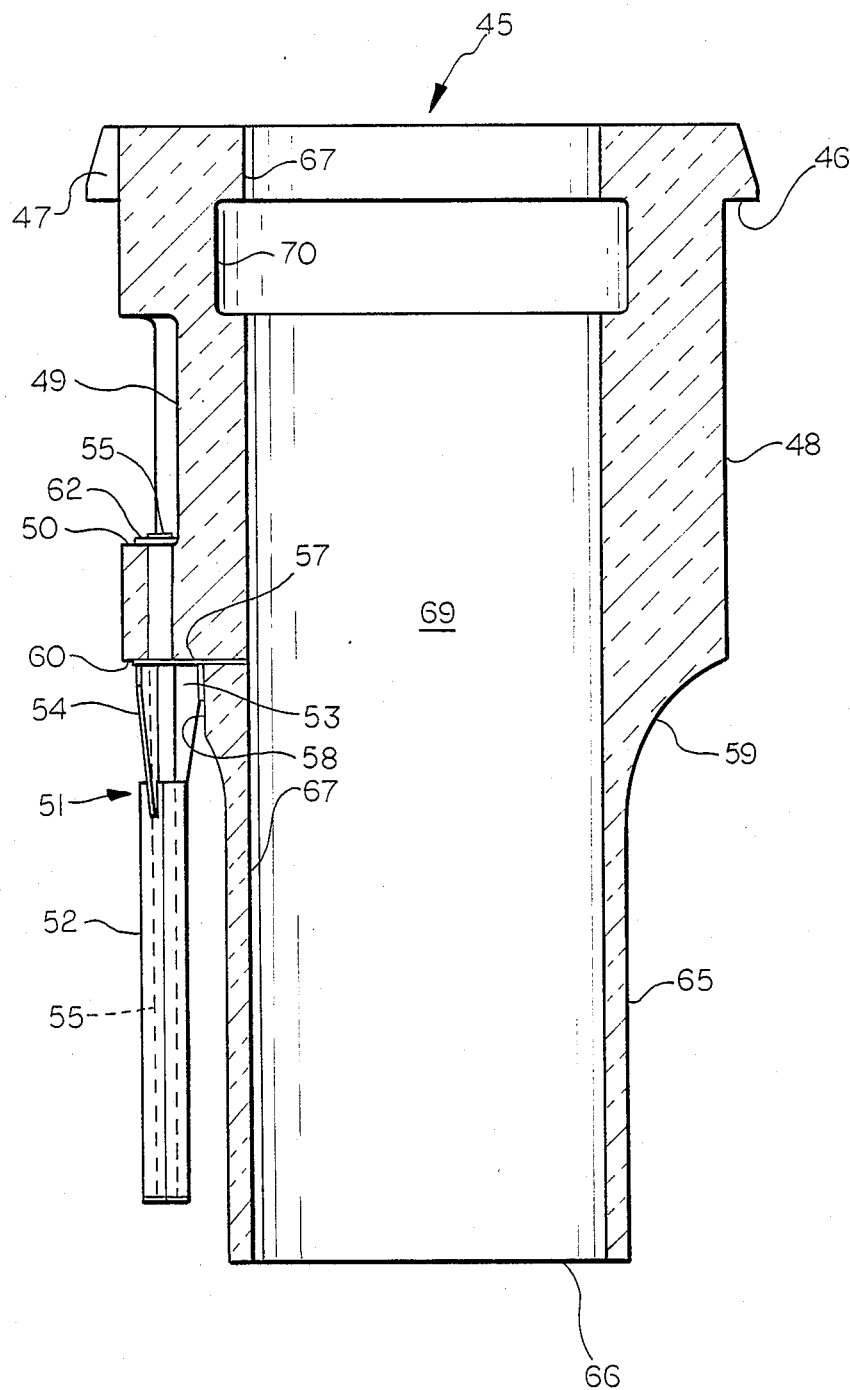
FIG. 4 is a sectional view taken along line 4—4 of FIG. 3.
Figure 5:
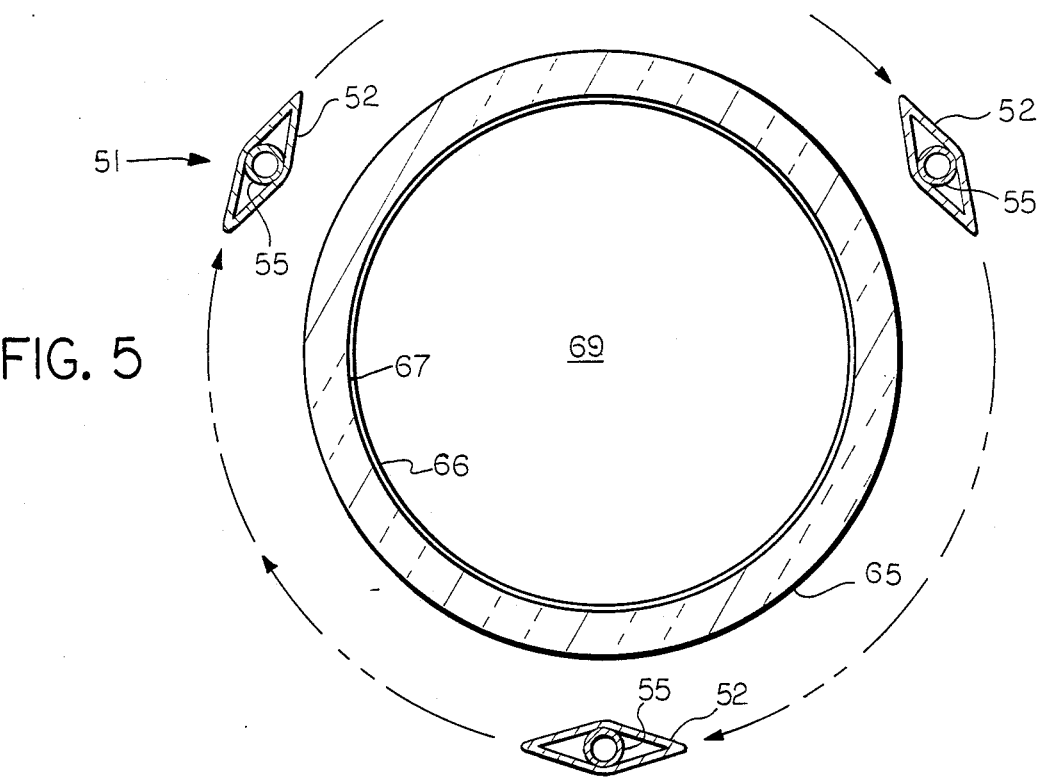
FIG. 5 is a sectional view taken along line 5—5 on FIG. 3.
Figure 6:
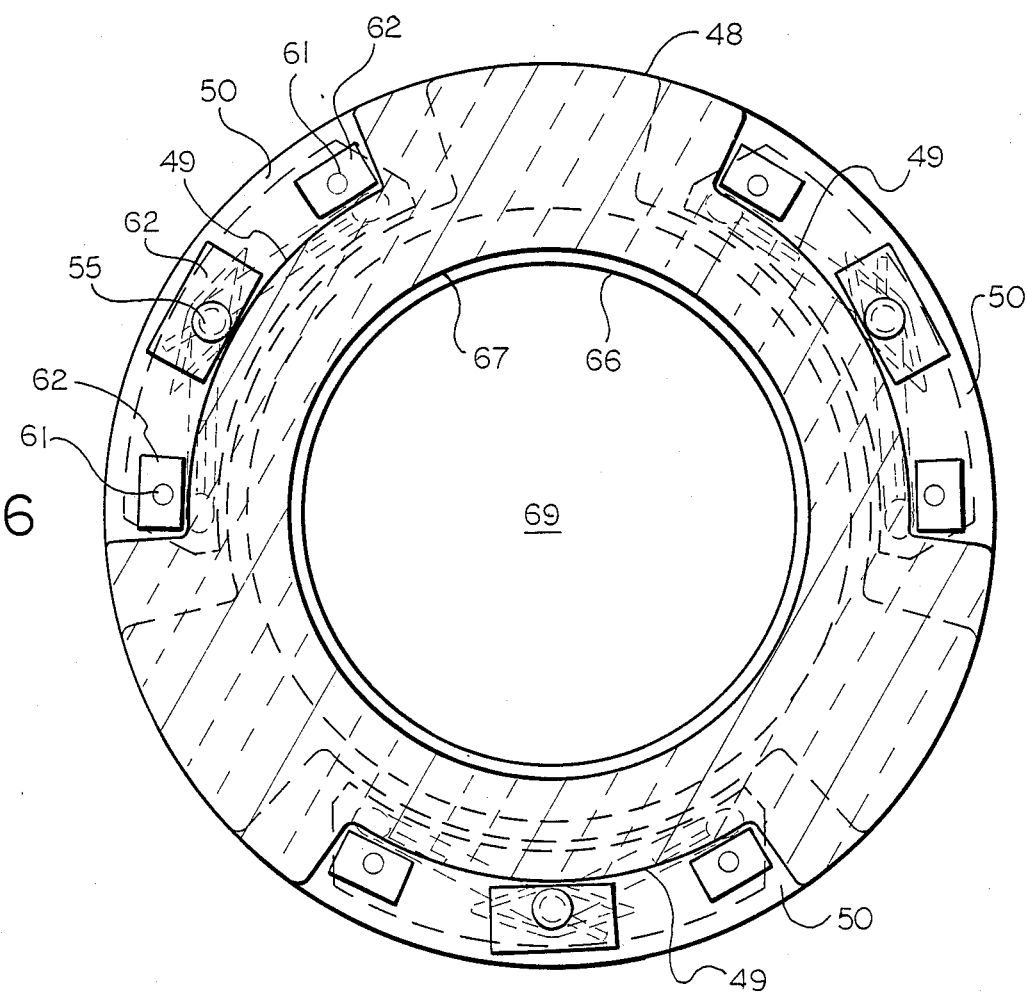
FIG. 6 is a sectional view taken along line 6—6 on FIG. 3.

Tube stirrer element 45 has a straight cylindrical upper segment 48 extending below lip 46 in which plural (three) radially recessed areas 49 are formed for attaching the stirrer assemblies. As seen on FIG. 6, there are three recesses 49 at equally-spaced locations around the periphery of upper segment 48. The number of recesses 49 may vary, the herein illustrated embodiment shows three recesses spaced 120° apart measured on their centers. Each area 49 includes a lower surface ledge 50 from which the stirrer assemblies 51 are suspended. The recessed areas 49 may be provided with further structural reinforcement by including vertical ribs (not shown) located between the plates 62 (see FIG. 6) and extending vertically between the top and bottom lateral surfaces of the well 49. As is best shown in FIG. 4, each one of the stirrer assemblies 51 comprise an elongated, hollow parallelogram-shaped or diamond-shaped blade 52 connected by sets of side angled braces 53 and radial braces 54. The braces 53 and 54 are fusion welded to the blades 52 near their upper end and arranged to hold the blade at the proper angled position in the molten glass. The other end of the braces 53, 54 are welded to a horizontal plate 57 to complete the stirrer assembly. The stirrer assemblies 51 are constructed of a platinum-rhodium (90–10) alloy which has preoperties to function successfully in molten glass at these temperatures. Each of the stirrer assemblies are fastened onto the tube-stirrer element at a well 58 cast into the shoulder area 59 below the upper cylindrical segment 48. Each well 58 has a radially top extending surface 60 that is parallel and substantially coextensive with the surface 50 in the upper recess 49. The radial wall formed between surfaces 50 and 60 provides a means to suspend the stirrers in a spaced relation to the outer wall of the lower tube segment 65. Plate 57 is welded to the two vertical upstanding rods 61. The operating positions of stirrer blades 52 are shown in FIG. 5 whereby the long dimension of the parallelogram (diamond) shape is positioned to orbit along a circular path as the tube stirrer 45 is rotated about its longitudinal center axis. A hollow support pipe 55 is welded inside each hollow blade 52 to extend across the short dimension of the parallelogram shape. Pipe 55 extends above blades 52 and through a cast hole in the wall between 50 and 60. Pipe 55 is welded onto top plate 62 to attach the blades in their operating position providing stability to the blade during service.

Each stirrer assembly 51 is further secured in place to the ceramic element 45 by two rods 61 that extend vertically in holes cast through the wall between 50 and 60. The rods 61 extend through corresponding holes in their left and right top plates 62 and are securely welded in place. Support pipe 55 extends through a bore in the middle of the plate 62 and is welded at the end and capped.

The lower cylindrical segment 65 of tube stirrer element 45 is of lesser diameter than upper segment 48, the transition between them begin in the radius of the shoulder section 59 in the casting of the ceramic part. The segment 65 performs the function of the tube in feeder operation.

In the installation as described for the preferred embodiment of the invention, the tube stirrer element is mounted such that its drive mechanism and its rotary carriage are well above the cover 15 of the feeder bowl away from the extreme heat generated above the feeder bowl so as to avoid oxidation and corrosion of the metallic parts. For this reason, these upper parts need not be made of refractory type metals (platinum alloy) which save considerably in the cost of the installation. There is but a single rotary drive needed to operate the tube and the stirrers of the invention. This construction overcomes problems found in prior devices, e.g. the Turbex system, by (1) maintaining a concentric alignment of the tube and stirrers by their being a unitary element; (2) maintaining the same rotational speeds of both stirrers and tube to significantly reduce blisters in the glass; (3) bearing failures, metal corrosion of the mounting assembly and moving parts of the drive are minimized because the metallic parts are located well out of the extreme heat environment of the glass feeder, thereby virtually eliminating corrosion of these parts and contamination of the glass, maintenance is reduced, and failures in the mechanism are avoided.

Below the shoulder 59 of element 45 is hollow cylindrical tube segment 65 of the casting 45. The tube segment has a substantially uniform thickness annular wall. This segment functions as the feeder tube. The segment 65 is partially immersed i the molten glass and rotated. It is positioned 1-5 inches above the top bowl well 13 in operation. From bottom end 66 of the tube, the inside wall surface 67 is slightly tapered upwardly and outwardly from vertical. The exterior wall surface is vertical. The taper of the inner wall 67 is built into the design for ease of casting the refractory element. The interior wall surface 67 is smooth and uniform from lower end 66 to the opposite top end providing an interior open passageway 69 of circular section throughout the length of the tube stirrer element 45. The passage 69 is open to atmosphere and is a vent for heat. In the interior of upper segment 48 at a level just below lip 46, there is an annularly enlarged cavity 70. This cavity 70 is provided for lifting element 45 into place for installation or for removing it from service in glass feeder 10.

The described embodiment of the invention is useful in feeding molten glass to press molds forming television tube face plates. The optical quality of this glassware requires it to be free of blisters, cords, checks and seeds. Use in manufacture of other quality optical glass parts is contemplated which will be enhanced by using this invention. While the foregoing description of the invention is directed to the best mode contemplated by the applicant, it should be apparent that modifications may be resorted to without departing from the spirit and scope of the appended claims.

What is claimed:

1. A tube stirrer element for use in a molten glass feeder comprising a hollow unit casting of ceramic material having
    a lower hollow circular tubular segment for immersion in molten glass and rotatable therein about its longitudinal center axis,
    a coaxial hollow upper segment having a radially larger outer surface than an outer surface of said lower segment,
    said upper and lower segments defining an axial passageway,
    said casting having a shoulder region between said lower segment and upper segment,
    a recess formed in the outer surface of said upper segment above said shoulder region, and
    a stirrer assembly comprising an elongated blade and means fastened to one end of the blade and supported in said recess of the casting for supporting the blade in an axially suspended position extending from below said shoulder region substantially parallel to the longitudinal axis of said lower segment and spaced radially from the outer surface of said lower segment.

2. The tube stirrer element of claim 1 in which the elongated blade of the stirrer assembly comprises an elongated, hollow blade having a parallelogram-shaped cross-section composed of refractory metal.

3. The tube stirrer element of claim 2 in which the refractory metal of said blade is a platinum-rhodium metal alloy.

4. The tube stirrer element of claim 3 wherein said means for supporting the blade comprises a platinum-rhodium metal alloy rod fastened to the one end of the blade and having a lower end disposed inside the hollow blade and an upper end extending axially above the one end of the blase, said shoulder region including an axially extending bore means through which the upper end of said rod extends into said recess, and fastening means for supporting the upper end of the rod in said recess to hold the rod in fixed axial position.

5. The tube stirrer element of claim 1 in which the outer surface of said upper segment includes an outwardly projecting annular lip formed at an upper segment axial end of the upper segment.

6. The tube stirrer element of claim 1 which includes an annular enlarged cavity formed internally of said upper segment along the passageway thereof, said enlarged cavity defining an annular surface for enabling engagement with a means for lifting said element.

7. The tube stirrer element of claim 1 wherein said hollow upper segment is circular.

8. In combination with a molten glass feeder bowl having an outlet orifice for discharging glass,
    a tube stirrer comprising a unitary ceramic casting having a lower hollow cylindrical tube portion and an upper hollow portion, said upper portion having an outside surface extending radially outwardly from an outside surface of said lower portion,
    elongated stirring means connected to the outside surface of said upper portion and disposed vertically alongside and spaced from the outside surface of said lower tube portion,
    a collar portion formed on the outside surface of said upper portion an upper end of said upper portion, said collar portion including a radially outwardly projecting annular lip,
    a supporting means for supporting said casting in a vertical operating position in said feeder bowl, said supporting means including a stationary annular member encircling said collar portion of said casting, an inner ring member including a radially inwardly projecting ledge, said lip of the ceramic casting being supported by said ledge, said inner ring member being supported for rotation on said stationary annular member,
    driven means attached to the inner ring member, and
    power drive means engaging said driven means for rotating said inner ring member and said ceramic casting supported thereby.

9. The combination of claim 8 wherein the elongated stirring means comprises
   a hollow elongated blade of a parallelogram-shaped cross-section,
   a rod having one end fastened to the interior of said hollow blade and a second end projecting above said blade and extending into said upper portion of the ceramic casting, and means engaging the second end of the rod for attaching the rod to the upper portion of said ceramic casting and thereby connecting the blade to the outside surface of said upper portion in a spaced substantially parallel relationship with the outside surface of said lower tube portion.

10. The combination of claim 9 in which said blade and rod are composed of a platinum-rhodium metal alloy.

11. The combination of claim 10 in which the rod is a hollow elongated tube composed of said metal alloy.

12. The combination of claim 10 wherein the said metal alloy is a 90-10 platinum-rhodium alloy.

13. A tubex implement for rotation about its longitudinal axis in a vertical position in a molten glass feeder bowl, said tubex implement comprising
   an enlarged cylindrical portion having an upper axial end with a radially projecting lip,
   a plurality of stirrer assemblies including axially extending elongated blades attached to the enlarged cylindrical portion and depending downwardly therefrom,
   a hollow cylindrical lower portion that is coaxial and integral with the enlarged cylindrical portion and having an external surface of lesser diameter than the enlarged cylindrical portion, the external surface of said lower portion being radially spaced from said stirrer blades.

14. The tubex implement of claim 13, wherein the elongated blades of the stirrer assemblies are diamond-shaped.

15. The tubex implement of claim 14, wherein said diamond-shaped blades are hollow.

16. The tubex implement of claim 15, wherein said blades are composed of platinum-rhodium metal alloy.

17. The tubex implement of claim 13, in which said lip is supported by a rotatably driven ring support.

* * * * *